United States Patent [19]

Barkman et al.

[11] Patent Number: 5,387,061
[45] Date of Patent: Feb. 7, 1995

[54] PARAMETER MONITORING COMPENSATION SYSTEM AND METHOD

[75] Inventors: William E. Barkman, Oak Ridge; Edwin F. Babelay, Knoxville; Paul D. DeMint, Kingston; Thomas L. Hebble, Oak Ridge; Richard E. Igou, Knoxville; Richard R. Williams; Edward J. Klages, both of Oak Ridge; William H. Rasnick, Knoxville, all of Tenn.

[73] Assignee: The United States of America as represented by the United States Department of Energy, Washington, D.C.

[21] Appl. No.: 950,194

[22] Filed: Sep. 24, 1992

Related U.S. Application Data

[63] Continuation-in-part of Ser. No. 628,525, Dec. 14, 1990, Pat. No. 5,255,199.

[51] Int. Cl.⁶ .............................................. G05B 19/42
[52] U.S. Cl. .................................. 409/80; 451/5; 318/568.1; 364/474.02; 364/474.17; 409/135
[58] Field of Search ............................ 26/56.5; 483/3; 409/135, 80; 400/56; 364/474.17, 474.02, 474.37, 475; 51/165.71, 165.73, 322, 281 R; 318/568.1, 577, 563, 632

[56] References Cited

U.S. PATENT DOCUMENTS

| | | | |
|---|---|---|---|
| 3,898,440 | 8/1975 | Fukuma et al. | 51/165.71 |
| 3,917,930 | 11/1975 | Davey et al. | 318/632 X |
| 3,946,296 | 3/1976 | Lahm | 318/563 |
| 4,031,368 | 6/1977 | Colding et al. | |
| 4,296,364 | 10/1981 | Fukuyama et al. | |
| 4,370,721 | 1/1983 | Berenberg et al. | |
| 4,382,215 | 5/1983 | Barlow et al. | 318/568.1 |
| 4,428,055 | 1/1984 | Zurbrick et al. | 364/474.02 |
| 4,450,652 | 5/1984 | Walsh | 51/322 |
| 4,620,281 | 10/1986 | Thompson | 364/475 |
| 4,678,976 | 7/1987 | Inoue | 318/577 |
| 4,700,224 | 10/1987 | Miyasaka et al. | |
| 4,736,625 | 4/1988 | Patterson et al. | |
| 4,807,145 | 2/1989 | Takahashi et al. | |
| 4,845,763 | 7/1989 | Bandyopadhyay et al. | |
| 4,864,777 | 9/1989 | McLaughlin et al. | 51/281 R |
| 4,918,627 | 4/1990 | Garcia et al. | |
| 5,095,788 | 3/1992 | Matoni | 364/474.37 |

FOREIGN PATENT DOCUMENTS 114838  7/1983  Japan .................................. 409/135

*Primary Examiner*—William Briggs
*Attorney, Agent, or Firm*—David E. Breeden; Stephen D. Hamel; William R. Moser

[57] ABSTRACT

A compensation system for a computer-controlled machining apparatus having a controller and including a cutting tool and a workpiece holder which are movable relative to one another along preprogrammed path during a machining operation utilizes sensors for gathering information at a preselected stage of a machining operation relating to an actual condition. The controller compares the actual condition to a condition which the program presumes to exist at the preselected stage and alters the program in accordance with detected variations between the actual condition and the assumed condition. Such conditions may be related to process parameters, such as a position, dimension or shape of the cutting tool or workpiece or an environmental temperature associated with the machining operation, and such sensors may be a contact or a non-contact type of sensor or a temperature transducer.

4 Claims, 3 Drawing Sheets

PARAMETER MONITORING COMPENSATION SYSTEM AND METHOD

BACKGROUND OF THE INVENTION

This invention was made with government support under contract DE-AC05-84OR21400 awarded by the U.S. Department of Energy to Martin Marietta Energy Systems, Inc., and the government has certain rights in this invention.

This is a continuation-in-part application of Ser. No. 07/628,525, filed Dec. 14, 1990 now U.S. Pat. No. 5,255,199, and entitled CUTTING TOOL FORM COMPENSATION SYSTEM AND METHOD, the disclosure of which is incorporated herein by reference.

This invention relates generally to the machining of workpieces and relates, more particularly, to a computer-controlled machining operation wherein a cutting tool is moved relative to a workpiece along a predetermined, or preprogrammed, path to effect a cut in a workpiece.

When a computer program is prepared for controlling the path of relative movement between the cutting tool and the workpiece in a computer-controlled machining apparatus, many parameters or conditions are normally presumed not to experience changes during an operation performed with the apparatus or possess errors at a preselected stage of such an operation. Examples of parameters normally presumed not to experience changes during a machining operation include the size and shape of the cutting edge of the cutting tool, a shift in position of the workpiece and environmental temperatures within which the machining operation is performed. For example, the program controlling the relative movement between the cutting tool and workpiece commonly does not compensate for wear-related changes or imperfections in the cutting tool edge, deflections of the workpiece or changes in the temperature or variations from a predetermined temperature of the workpiece during a machining operation.

Examples of parameters normally presumed not to possess errors at a preselected stage of a machining operation include the interface or relative position between the cutting tool and the workpiece, the dimensions of the workpiece being machined, and the cutting tool path. If, for example, the workpiece is not positioned in proper registry with the cutting tool at the outset of a machining operation, the operation may begin and continue in error. Any of the aforementioned error sources spawn repeatable errors and could lead to a resulting product whose finished dimensions do not correspond to the desired, or prescribed, dimensions. Of course, in machining applications in which a relatively high degree of precision is required, the inability of machining apparatus to compensate for variations between actual and assumed parameters may ultimately result in an unacceptable product.

The referenced co-pending application Ser. No. 07/628,525 describes an optical system for use with a computer-controlled machining apparatus wherein adjustments may be made during a machining operation to compensate for optically-detected differences between actual conditions and the conditions which the computer program assumes to exist so that the dimensional accuracy of a product formed with the apparatus is enhanced. It would be desirable, however, to provide alternative systems for detecting such differences and for altering a machining operation accordingly.

Accordingly, it is an object of the present invention to provide a new and improved system and method for a computer-controlled machining apparatus for altering the machining operation at a preselected stage to take into account an actual condition at that stage.

Another object of the present invention is to provide such a system and method wherein the altering of the machining operation involves the obtaining of information relating to the actual condition at the preselected stage and then comparing the obtained information to a condition presumed by the program to exist.

SUMMARY OF THE INVENTION

This invention resides in a compensation system and method for use in conjunction with a computer-controlled machining apparatus having a controller and including a cutting tool and a workpiece holder which are movable relative to one another along a preprogrammed path during a machining operation for effecting a cut in a workpiece held by the workpiece holder. The preprogrammed path of relative movement is based upon an assumed condition at a preselected stage of the machining operation.

The system of the invention includes a database associated with the controller including criteria relating to the assumed condition at the preselected stage of the machining operation and also includes means for obtaining information relating to the actual condition at the preselected stage of the machining operation. The system also includes means for comparing the obtained information relating to the actual condition with the criteria relating to the assumed condition and for altering the path of relative movement between the cutting tool and workpiece holder in accordance with a variation detected between the actual condition and the assumed condition.

The method of the invention includes a step of obtaining information relating to the actual condition at the preselected stage of the machining operation. The obtained information relating to the actual condition is then compared with the criteria relating to the assumed condition, and the preprogrammed path of relative movement is altered in accordance with a variation detected between the actual condition and the assumed condition.

DETAILED DESCRIPTION OF AN ILLUSTRATIVE EMBODIMENT

Figure 1:
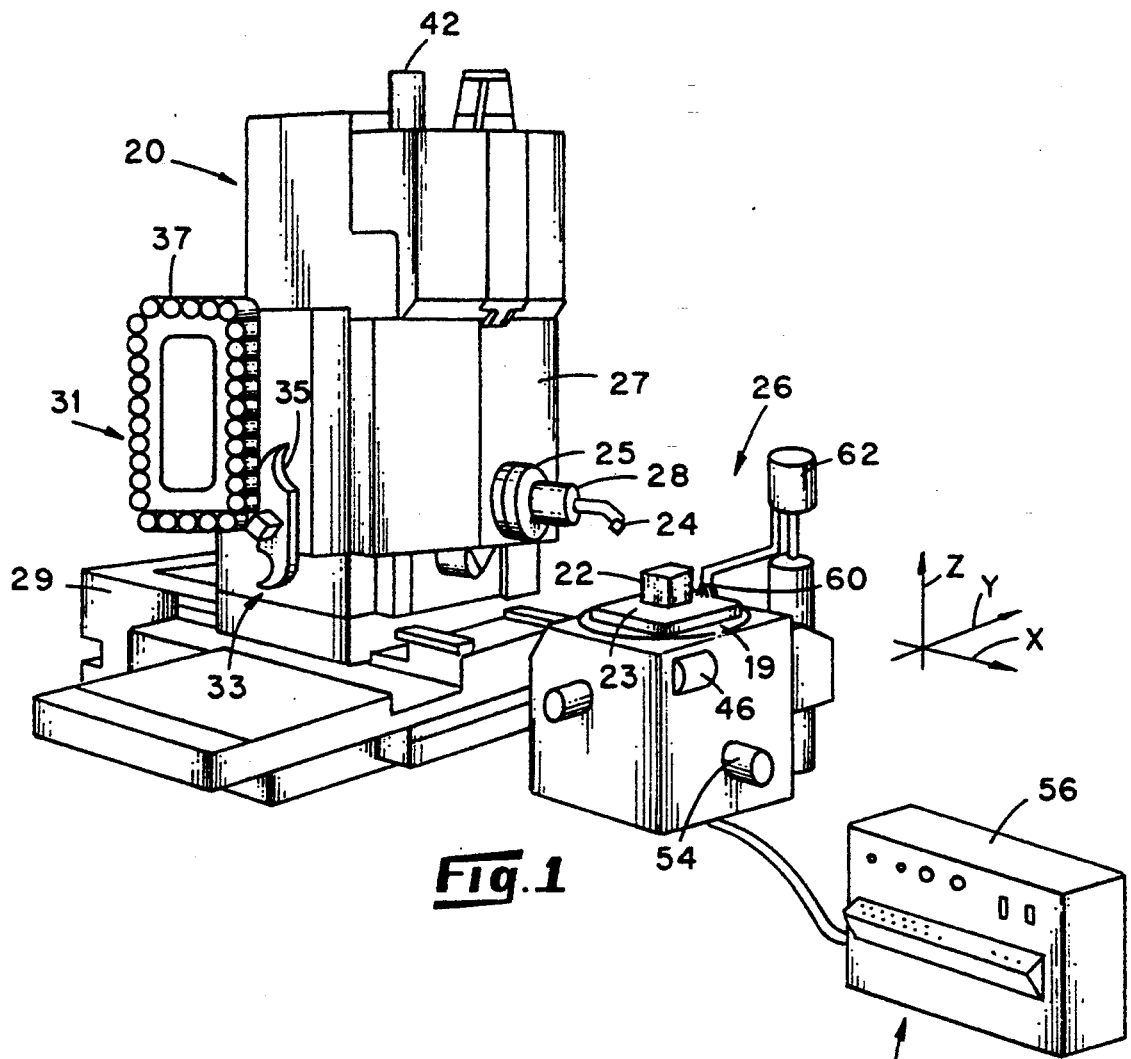
FIG. 1 is a schematic perspective view of a machining apparatus within which an embodiment of a compensation system is incorporated.
Figure 2:
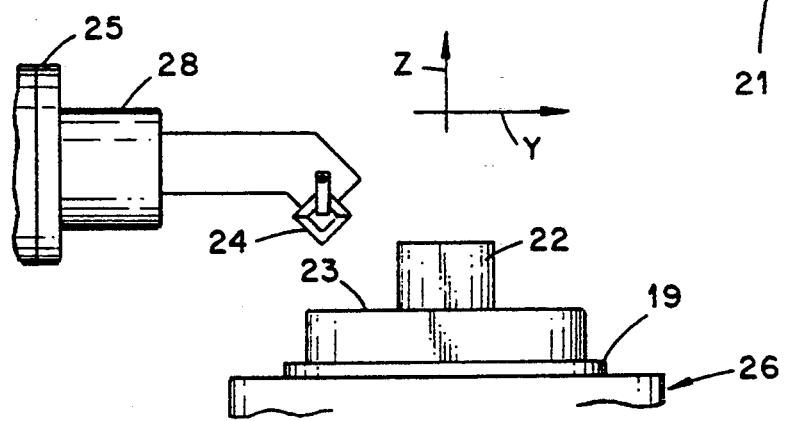
FIG. 2 is an elevational view of fragments of the FIG. 1 apparatus.

Referring now to the drawings in which like reference characters designate like or corresponding parts throughout the several views, there is shown in FIG. 1 a schematic overview of a computer-controlled machining apparatus, indicated 20, employing a compensation system 21 including features of the present invention. The machining apparatus 20 is commonly referred to as a machining center and includes a spindle 25 for selectively holding a cutting tool 24 or probe in the manner described herein and means, indicated 26, for holding a workpiece 22 in a condition for being worked upon by a cutting tool or being monitored or measured with a probe. In the depicted embodiment and as best shown in FIG. 2, the workpiece 22 is in the form of a body of metal stock across which a cutting tool 24 is moved in a milling operation. In addition, a cutting fluid, or coolant 60 (FIG. 1), is applied to the workpiece 22 from a reservoir 62 during the machining operation.

Although the machining apparatus 20 is shown and described herein for use in a milling operation, the features of the compensation system 21 may be incorporated within other types of machining apparatus, such as a turning or grinding apparatus. Accordingly, the principles of the present invention may be variously applied.

With reference again to FIG. 1, the spindle 25 is supported by a carrier, or carriage 27, which, in turn, is supported upon a base 29. A reversible drive motor 42 is associated with the carrier 28 for moving the spindle 25 in either of two directions along the illustrated Z-coordinate axis. The workpiece holding means 26 includes a table 19 upon which the workpiece 22 is secured, and reversible motors 46 and 54 are associated with the table 19 for moving the table 19 along the illustrated X-coordinate direction and the illustrated Y-coordinate direction, respectively. Each of the motors 42, 46 and 54 is connected to a computer controller 56 which, in turn, controls the actuation of the motors 42, 46 and 54. It follows from the foregoing that by controlling the actuation of the motors 42, 46 and 54, the X, Y and Z-coordinate positions of the spindle 25 (or the cutting tool held thereby) relative to the workpiece 22 can be controlled.

A cutting tool 24 of the type intended to be held within the spindle 25 is mounted within a toolholder 28 in a manner which facilitates replacement of the cutting tool when desired. There is associated with the machining apparatus 20 a movable rack 37 within which a plurality of toolholders comparable to that of toolholder 28 are stored. A tool changer 33 including a tool interchange arm 35 interacts in a well-known manner with the rack 37 and the spindle 25 for changing the toolholder 28 held thereby with an alternative toolholder stored within the rack 37. The interchange of the toolholder 28 for another toolholder is controlled by the controller 56.

In one program associated with the depicted embodiment, the machining apparatus 20 is programmed to remove a layer of material from the workpiece surface 23 with successive passes of the tool 24 across the surface 23 in the X-coordinate direction and with an incremental shift of the tool 24 in the Y-coordinate direction between successive passes. Upon removal of one layer of material from the surface 23, the tool 24 is shifted downwardly (i.e., along the Z-coordinate axis) by an incremental amount in preparation of the removal of an additional layer of material from the workpiece surface 23. Additional layers are subsequently removed, as necessary, until a desired thickness of material is removed from the workpiece surface 23. The apparatus 20 may also be programmed to move the tool 24 relative to the workpiece 22 along multi-axis arcuate contours for profile milling operations.

Figure 3:
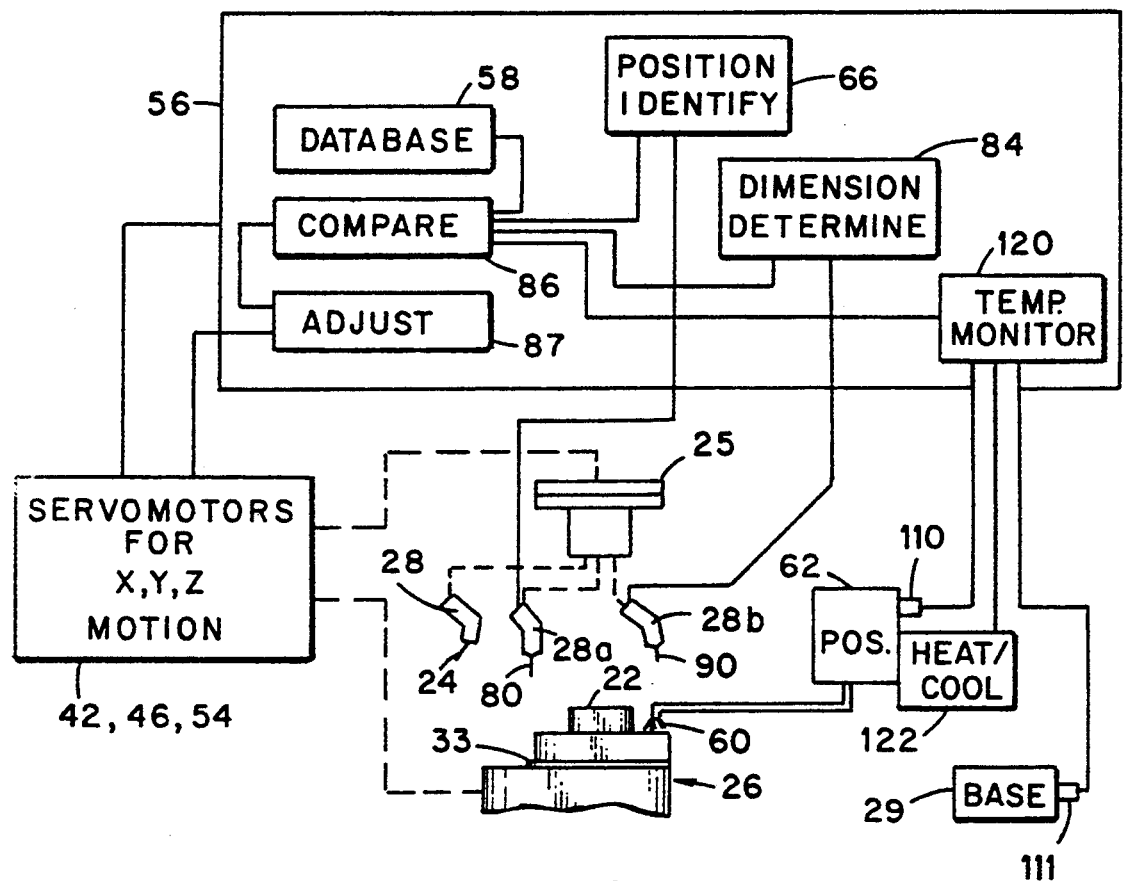
FIG. 3 is a schematic diagram illustrating various operations of the tool form compensation system of the FIG. 1 apparatus.

With reference to FIG. 3, the controller 56 includes a database 58 including criteria relating to any of several expected or presumed conditions at preselected stages of the machining operations. Such conditions include the position of the cutting tool 24 relative to the workpiece 22 at preselected stages of the machining operation and the shape and dimensions of the workpiece 22 at preselected stages of the machining operation. If such parameters, however, experience changes during a machining operation or possess errors at a preselected stage of the machining operation, then the workpiece, when finished, is not likely to possess the desired dimensions unless the path of movement between the cutting tool 24 and workpiece 22 is altered accordingly. As will be apparent herein, the compensation system of the apparatus 20 generates data relating to any of several actual conditions at preselected stages of the machining operation and upon determining that the actual conditions differ from the presumed conditions, the compensation system 21 alters the preprogrammed path of movement between the cutting tool 24 and workpiece 22 to compensate for such a difference.

Figure 4:
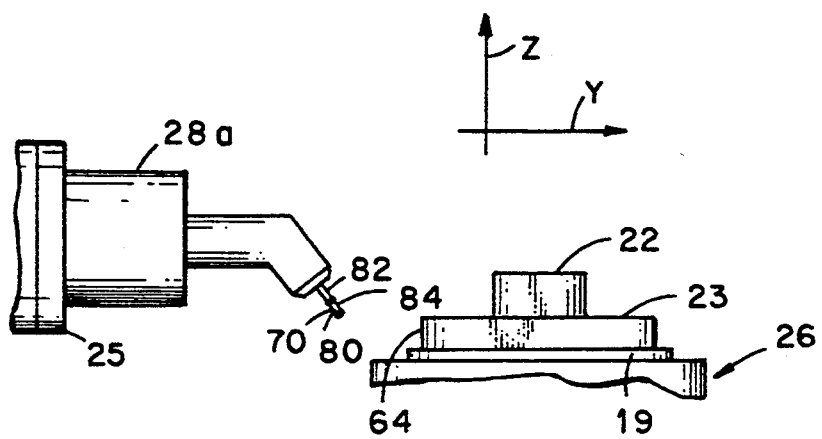
FIG. 4 is an elevational view of fragments of the FIG. 1 apparatus used for obtaining information relating to actual parameters of the workpiece being worked upon.

To illustrate an operation of the compensation system 21, reference can be had to FIG. 4 wherein the depicted workpiece 22 has a front face 64 which is presumed to be positioned in a predetermined vertical plane when worked upon by the cutting tool 24. If the front face 64 is not positioned in the predetermined vertical (i.e., the X-Z) plane, and the preprogrammed cutting path is not adjusted accordingly, the resulting, or finished, product may not be accurately machined.

It is a feature of the depicted apparatus 20 that the compensation system 21 includes means, generally indicated 66 in FIG. 3, for identifying the actual vertical (i.e., the X-Z) plane within which the front face 64 of the workpiece 22 is positioned, and, upon determining that the actual vertical plane within which the front face 64 is positioned does not correspond with the predetermined vertical plane, the compensation system 21 alters the preprogrammed path of movement of the cutting tool 24 relative to the workpiece 22 by a corresponding amount. To this end, the system 21 includes a toolholder 28a (FIG. 4) upon which a sensor 70 is mounted and which is positioned within the toolholder rack 37 until needed. When a check of the position of the front face 64 is desired, the controller 56 moves the spindle 25 into registry with the tool interchange arm 35 where the toolholder 28 is positioned within the rack 37 and the toolholder 28a is accepted by and secured within the spindle 25. The controller 56 subsequently sends appropriate command signals to the motors 42, 46 or 54 so that the sensor 70 moves into contact with the front face 64 in a manner described herein.

Figure 5:
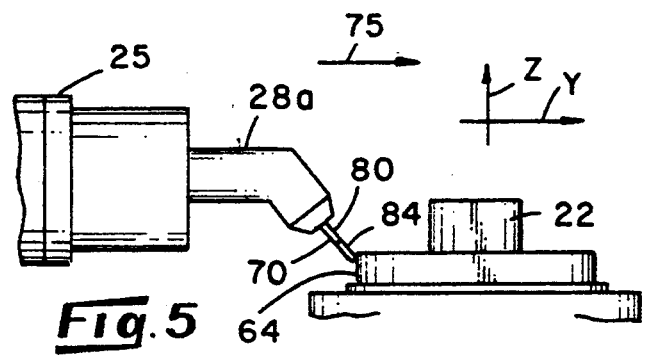
FIGS. 5 and 6 are views similar to that of FIG. 4 illustrating alternative sensors associated with the FIG. 1 apparatus and in contact with the workpiece.

Although the sensor 70 may take any of a number of forms, the depicted sensor 70 of FIGS. 4 and 5 is a touch trigger probe 80 having a mount 82 which is fixedly joined at one end so as to extend outwardly from one end of the toolholder 28a and an articulated portion 84 which is pivotally joined at one end to the mount 82. The probe 80 is a switch which includes an internal spring mechanism for spring-biasing the articulated portion 84 toward a position at which the articulated portion 84 is axially aligned with the mount 82 and is adapted to open or close a circuit upon movement of the articulated portion 84 out of axial alignment with the mount 82. Accordingly, the touch probe 80 is appropriately wired in a circuit associated with the controller 56, which circuit includes conductors extending through the body of the toolholder 28a between the mount 82 and contacts mounted within the spindle 25, so that upon movement of the probe 80 relative to the workpiece 22 in the direction of the FIG. 5 arrow 75 until the articulated portion 84 contacts the workpiece face 64 (as illustrated in FIG. 5) and moves out of axial alignment with the mount 82, the controller 56 senses when the probe 80 contacts the workpiece face 64. A probe found to be well-suited for use as a probe 80 is available from Renishaw, Inc.

In the depicted example, the probe 80 approaches the workpiece face 64 in the direction of the FIG. 5 arrow 75 (corresponding with a Y-coordinate direction) as the controller 56, by way of the appropriate servomotors, moves the spindle 25 and workpiece 22 toward one another, and the controller 56 is adapted to halt the continued advance of the probe 80 upon sensing contact between the probe 80 and the workpiece face 64. Upon sensing contact between the workpiece face 64 and the probe 80, the controller 56 interprets the actual Y-coordinate position (i.e., the actual X-Z plane) within which the face 64 is positioned as a function of the distance from a reference position along the Y-axis that the probe 80 is moved until the instance of contact between the probe 80 and workpiece face 64. The controller 56 also includes a comparison circuit 86 (FIG. 3) for comparing the actual Y-coordinate position of the workpiece face 64 with the information relating to the assumed position (stored within the database 58) of the workpiece face 64 along the Y-coordinate axis. The comparison circuit 86 determines whether or not a variance between the actual and assumed positions exists, the magnitude of the variance, if any, and sends appropriate command signals to an appropriate circuit 87 within the controller 56 for adjusting the programmed path of the cutting tool 24 according to the magnitude of the variance. If, for example, the actual Y-coordinate position of the workpiece face 64 is determined to be 1.0 mm to one side of the assumed Y-coordinate position, the tool workpiece-holding table 19 is shifted, by means of the servomotor 54, in the appropriate direction along the Y-coordinate axis by a corresponding amount, e.g., 1.0 mm, so that subsequent passes of the cutting tool 24 across the workpiece surface 23 to effect a cut therein compensates for the difference between the actual and assumed position of the face 64 of the workpiece 22 relative to the Y-coordinate axis.

It may be desired that the accuracy of the position of the face 64 of the workpiece 22 be checked at several stages during the machining operation. Such stages may include the outset of the machining operation (i.e., before the cutting tool 24 makes any passes across the workpiece surface 23) and at a stage immediately prior to the finishing passes of the tool 24 across the workpiece surface 23. Accordingly, the controller 56 is preprogrammed to interrupt the cutting of the workpiece 22 at such stages and initiate the operation of the compensation system so that compensation may be made to the path of the cutting tool 24 in response to the difference determined to exist between the actual position and assumed position of the workpiece face 64.

It will be understood that the aforedescribed sensor 70 could take an alternative form to that of the touch trigger probe 80 for checking the actual position of the workpiece surface 64. For example, the sensor 70 maybe provided by a linear variable differential transformer (LVDT), indicated 90 in FIGS. 3 and 6, having an outer shaft portion 92 fixedly secured at one end to a toolholder 28b so as to extend outwardly thereof and a telescoping probe portion 94 which is slidably positioned within the shaft portion 92 between an extended position and a retracted position. The LVDT 90 includes an internal mechanism which spring-biases the telescoping probe portion 94 toward its extended position. The LVDT 90 is appropriately connected to the controller 56 through the body of the toolholder 28b so that upon movement of the probe portion 94 from its extended position to a retracted position of rest, the controller 56 can calculate the distance moved by the probe portion 94 from its extended position.

For purposes of understanding the operation of the LVDT 90 within the compensation system 21, the use of the LVDT 90 will now be described in connection with the obtaining of information relating to an actual dimension of the workpiece 22 at a preselected stage of the machining operation.

Figure 6:
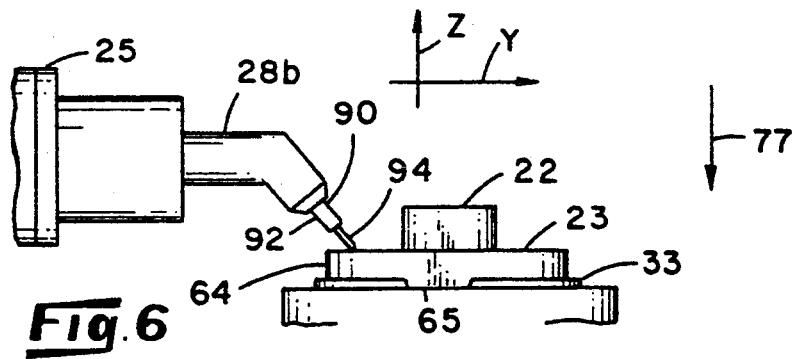

In order to use the sensor 90 to determine, for example, the thickness, i.e. the vertical thickness, of the workpiece 22 as measured between its upper surface 23 and bottom surface, indicated 65 in FIG. 6, information is input into the controller database 58 relating to the reference position (along the Z-axis) of the bottom surface 65 of the workpiece 22, the reference position (along the Z-axis) relative to the bottom surface 65 of the workpiece 22 at which the probe 90 is positioned prior to its movement toward the workpiece 22 in a measurement-obtaining operation, and the expected or assumed thickness of the workpiece 22 as measured between the upper and bottom surfaces 23, 65 of the workpiece 22 at a preselected stage. The toolholder 28b is initially positioned in an elevated position with respect to the workpiece surface 23 when positioned in its reference position and subsequently moved downwardly in the direction of the FIG. 6 arrow 77 (corresponding to a Z-coordinate direction) toward the surface 23 by a predetermined distance corresponding to a distance at which the probe portion 94 is expected to contact the surface 64 and so that the probe portion 94 retracts within the shaft portion 92 by a predetermined amount as illustrated in FIG. 6.

If upon movement of the LVDT 90 into engagement with the surface 64 as aforesaid so that the LVDT 90 reacts as expected, then the controller 56 will determine that the actual position (in the X-Y plane) at which the workpiece surface 23 is positioned corresponds to the assumed position (in the X-Y plane) of the workpiece surface 23 at that stage based upon the total distance traveled by the probe portion 94 along the Z-axis from the initial reference position before coming to its final position of rest adjacent the workpiece surface 23. If, on the other hand, the LVDT 90 reacts in an unexpected fashion so that the probe portion 94 retracts either too little or too far within the shaft portion 92 before coming to a position of rest, the controller 56 determines the actual position of the workpiece surface 23 as a function of the actual distance traveled by the probe portion 94 along the Z-axis before arriving at its final rest position.

With the information relating to the assumed position of the bottom surface of the workpiece 22 contained within the database 58, the controller 56 can calculate (by way of a subtraction operation) the actual thickness of the workpiece 22 as a function of the actual position (in the X-Y plane) of the workpiece surface 23 and the assumed position of the bottom surface 65 of the workpiece 22.

With reference again to FIG. 3, the comparison circuit 86 is adapted to compare the actual thickness of the workpiece 22, as measured with the sensor 90, to the assumed thickness of the workpiece 22 at the preselected stage, to determine whether any variance between the actual and assumed thicknesses exist and, if so, the magnitude of the variance. Upon determining the existence and magnitude of the variance, the controller 56 then sends appropriate command signals to the servomotors 42, 46 and 54 by way of the adjustment circuit 87 so that upon subsequent replacement of the toolholder 28b with the toolholder 28, the cutting tool 24 held within the toolholder 28 is re-positioned relative to the workpiece-holding table 19 in a corresponding direction and by a corresponding amount so that a subsequent pass of the cutting tool 24 across the workpiece 22 takes into account the variance between the actual and assumed dimension (i.e., thickness) of the workpiece 22.

A check for a variance between the actual and presumed thicknesses of the workpiece 22 as aforedescribed may be made at any of several stages of the machining operation. To ensure dimensional accuracy of the finished product, it is preferred that the workpiece thickness be checked at a stage just prior to the final pass of the cutting tool 24 across the workpiece 22. Accordingly, the controller 56 is preprogrammed to interrupt the cutting of the workpiece 22 at such a preselected stage and initiate the desired check of the thickness of the workpiece 22 with the sensor 90.

Although each sensor 70 or 90 supported by a corresponding toolholder 28a and 28b has been described above as requiring that contact be made between the sensors 70 or 90 and the workpiece 22 in order that the compensation system 21 be able to perform its intended operation, it will be understood that a compensation system in accordance with the broader aspects of the invention may require no contact between its sensor and the workpiece surface. Such a compensation system may utilize an optical system described in co-pending application Ser. No. 07/628,525 or utilize a sensor in the form of a non-contact capacitance probe adapted to sense the presence of the workpiece surface when moved into proximate relationship with the workpiece surface.

Figure 7:
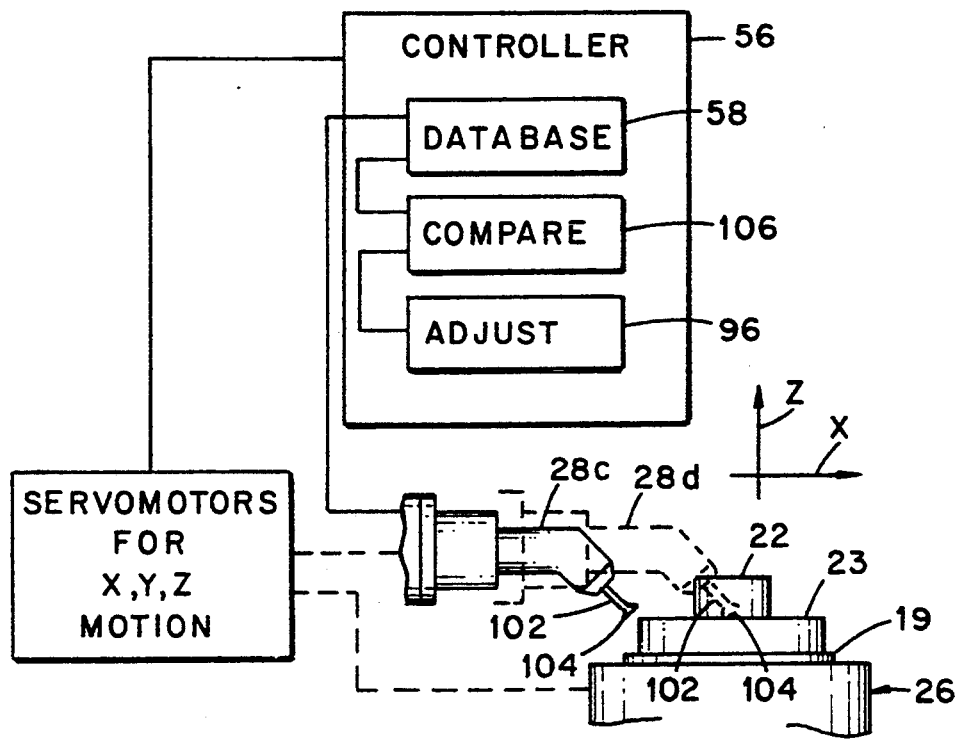
FIG. 7 is a schematic diagram illustrating operation of an alternative tool form compensation system to that of the FIG. 1 apparatus.

For example, there is shown in FIG. 7 a toolholder 28c and a capacitance probe 102 attached so as to extend away from an end of a toolholder 28c. In the illustrated FIG. 7 embodiment, the capacitance probe 102 has a spherical tip 104 and, when positioned within the spindle 25, is appropriately wired to the controller 56 through the body of the toolholder 28c to indicate the presence of a workpiece surface 23 when the tip 104 is moved into proximity therewith as from the position illustrated in solid lines in FIG. 7 to the position illustrated in phantom, in FIG. 7. In practice, the probe 102 may be appropriately wired within a circuit associated with the controller 56 and adapted to either make or break the circuit or detect the amplitude of the positional variation upon movement from a remote position into proximate relationship with the workpiece surface. In other words, the output signal of the capacitance probe 102 can be generated like that of the aforedescribed LVDT 90 or touch probe 80. Such a probe 102 is particularly well-suited for sweeping the surface 23 of the workpiece 22 as the toolholder 28c is moved with the spindle 25 along the X-axis along a preprogrammed path of movement relative to the workpiece-holding table 19 so that the controller 56 receives information regarding the actual shape of the workpiece contour as the probe 102 is moved thereacross.

The controller database 58 (FIG. 7) has been preprogrammed with information relating to the contour of the surface 23 of the workpiece 22 which the workpiece surface 23 is presumed to possess at preselected stages of the machining operation, and the controller 56 includes a comparison circuit 106 for comparing the actual contour of the workpiece surface 23 to the presumed contour. Upon a determination by the comparison circuit 106 that a variance exists between the actual and assumed contour, appropriate signals are forwarded to the servomotors 42, 46, 54, by way of an adjustment circuit 96, so that subsequent passes of the cutting tool 24 (FIG. 1) across the workpiece surface 23 compensate for the determined variance.

Therefore, to utilize the compensation system 21 with the probe 102 for obtaining information relating to the actual contour of the workpiece surface 23, the machine operation is halted at a preselected stage, the toolholder 28 is replaced by the toolholder 28c, and the toolholder 28c is moved across the workpiece surface 23 so that the tip 104 of the noncontact capacitance probe 102 sweeps across the workpiece surface 23. If, after comparing the information gathered by way of the probe 102 regarding the actual contour of the workpiece 22 with the information relating to the expected contour of the workpiece 22 at the preselected stage, the controller 56 determines that a variance exists, the preprogrammed path of the movement of the cutting tool 24 relative to the toolholder 28 is altered accordingly. Although information relating to the actual contour of the workpiece 22 may be obtained at any of several preselected stages of the machining operation, it is preferred that such information be gathered immediately prior to the finish machining pass. Accordingly, the controller 56 is preprogrammed to initiate the movement of the toolholder 28c across the workpiece 22 in an information-gathering operation just prior to the finish machining pass.

With reference again to FIG. 1 and as mentioned earlier, the machining apparatus 20 is provided with a reservoir 62 containing an amount of cutting fluid, or coolant 60, which is dispensed upon the workpiece 22 during the course of a machining operation. If the temperature of the coolant 60 contained within the reservoir 62 is at a temperature which is different from that of the workpiece 22, the workpiece 22 may experience either expansion, contraction or warpage as the coolant 60 is dispensed thereon. Of course, if the path of relative movement of the cutting tool 24 and workpiece holding means 26 does not take into account an expected variation in size or shape of the workpiece 22 during the course of a machining operation, the finished product may possess an unacceptable size or shape. Accordingly, it is a feature of the machining apparatus 20 that its compensation system 21 includes means, indicated 120 in FIG. 3, for monitoring the temperature of the coolant 60 and means for altering the temperature of the coolant 60 in response to a sensed difference between the actual temperature of the coolant 60 and the temperature of a reference element, such as the base 29 of the machine 20.

To this end and with reference still to FIG. 3, the database 58 contains information relating to the size, shape and position of the workpiece 22 which the workpiece 22 is assumed to possess during a machining operation, and the temperature monitoring means 120 includes temperature transducers 110, 111 appropriately positioned in contact with the coolant 60 contained within the reservoir 62 and the machine base 29, respectively. Moreover, a chiller/heater unit 122 is appropriately wired to the controller 56 for controlling the operation of the unit 122 and is positioned in heat exchange relationship with the coolant 60. The comparison circuit 86 is adapted to compare, at preselected stages, the actual temperature of the coolant 60 as measured with the transducer 110 to the temperature of the machine base 29 as measured with the transducer 111 and to determine whether any variance between the coolant and machine base temperatures exists. Upon determining the existence of the variance, the controller 56 either increases or decreases the temperature of the coolant 60 by way of the chiller/heater unit 122 to bring the temperature of the coolant 60 into correspondence with that of the machine base 29.

As an alternative to the aforedescribed scheme for altering the temperature of the coolant 60, it may be preferred that the database 58 of the controller 56 be provided with an acceptable range of temperatures within which the coolant temperature may fall without requiring that the system be halted. In this alternative example, the comparison circuit 86 is adapted to compare, at preselected stages, the actual temperature of the coolant 60 to the acceptable and broader ranges of workpiece temperatures. If the actual coolant temperature is determined to fall within the acceptable range, no action is taken to halt the process. If, on the other hand, the coolant temperature is determined to fall within the broader range of temperatures but outside of the acceptable range, the controller sends an alarm signal to the user. Yet still further, if the coolant temperature is determined to fall outside of the broader range, the controller 56 may be preprogrammed to interrupt, or shut down, the machining operation. This latter feature may be readily appreciated in view of the fact that errors in the machining operation may be magnified by a large differential between the actual coolant temperature and the temperature which the coolant is presumed to possess.

It will be understood that numerous modifications and substitutions may be had to the aforedescribed embodiments without departing from the spirit of the invention. For example, although the machining apparatus 30 has been shown and described as including a cutting tool 24 capable of movement in any of three coordinate directions, a compensation system in accordance with the broader aspects of this invention may be utilized with machining apparatus whose cutting tool may be moved in only one or two coordinate directions relative to a workpiece. Furthermore, although the aforedescribed compensation system has been described as including a spindle 25 which is movable toward and away from or across a workpiece surface for determining the actual location of a surface of the workpiece or the actual workpiece contour, the principles of the invention may be applied to make alternative measurements or checks of the workpiece 22 or of the cutting tool 24. Accordingly, the aforedescribed embodiments are intended for the purpose of illustration and not as limitation.

What is claimed is:

1. In a computer-controlled machining apparatus having a controller and including a cutting tool and a workpiece holder which are movable relative to one another along a preprogrammed path during a machining operation for effecting a cut in a workpiece held by the workpiece holder wherein the preprogrammed path of relative movement between the cutting tool and workpiece holder is based upon an assumed temperature of the workpiece at a preselected stage of the machining operation, and the apparatus includes means for dispensing a coolant upon the workpiece during a machining operation, the improvement comprising:

a database associated with the controller including criteria relating to a predetermined range of acceptable temperatures of the workpiece at the preselected stage of the machining operation;

means for obtaining the actual temperature of the coolant at the preselected stage of the machining operation;

means for comparing the actual temperature of the coolant to temperatures within the predetermined range of temperatures; and means for altering the temperature of the coolant to bring the coolant temperature within the predetermined range when the actual coolant temperature is determined to be outside of the predetermined range.

2. In a computer-controlled machining apparatus having a controller and including a cutting tool and a workpiece holder which are movable relative to one another along a preprogrammed path during a machining operation for effecting a cut in a workpiece held by the workpiece holder wherein the preprogrammed path of relative movement between the cutting tool and workpiece holder is based upon an assumed condition associated with the machining operation at a preselected stage of the machining operation, the improvement comprising:

a database associated with the controller including criteria relating to the assumed environmental temperature at the preselected stage of the machining operation;

means including means for determining the actual environmental temperature for obtaining information relating to the actual environmental temperature at the preselected stage of the machining operation; and means for comparing the obtained information relating to the actual environmental temperature with the criteria relating to the assumed environmental temperature at the preselected stage of the machining operation and for altering the preprogrammed path of relative movement in accordance with a variation detected between the actual environmental temperature and the assumed environmental temperature.

3. In a computer-controlled machining apparatus having a controller and including a cutting tool and a workpiece holder which are movable relative to one another along a preprogrammed path during a machining operation for effecting a cut in a workpiece held by the workpiece holder wherein the preprogrammed path of relative movement between the cutting tool and workpiece holder is based upon an assumed condition at a preselected stage of the machining operation, the improvement comprising:
- a database associated with the controller including criteria relating to the assumed condition at the preselected stage of the machining operation;
- means including means for determining an environmental temperature associated with the machining operation for obtaining information relating to the actual condition at the preselected stage of the machining operation; and
- means for comparing the obtained information relating to the actual condition with the criteria relating to the assumed condition including means for comparing the actual temperature with temperatures within a predetermined range of temperatures and for interrupting the operation of the machining apparatus when a variation is detected between the actual condition and the assumed condition and the variation is outside of a predetermined range.

4. In a computer-controlled machining operation including the steps of moving a cutting tool and a workpiece holder relative to one another along a preprogrammed path during a machining operation to effect a cut in a workpiece held by the workpiece holder and wherein the preprogrammed path of relative movement between the cutting tool and workpiece holder is based upon an assumed condition at a preselected stage of the machining operation, the improvement comprising:
- providing a controller with a database including criteria relating to the assumed environmental temperature at the preselected stage of the machining operation;
- obtaining information relating to the actual environmental temperature at the preselected stage of the machining operation;
- comparing the obtained information relating to the actual environmental temperature with the criteria relating to the assumed environmental temperature at the preselected stage of the machining operation; and
- altering the preprogrammed path of relative movement between the cutting tool and the workpiece holder in accordance with a variation detected between the actual environmental temperature and the assumed environmental temperature.

* * * * *